(12) United States Patent
Sung et al.

(10) Patent No.: US 8,150,109 B2
(45) Date of Patent: Apr. 3, 2012

(54) LARGE VOLUME FACE RECOGNITION APPARATUS AND METHOD

(75) Inventors: Younghun Sung, Suwon-si (KR); Jongha Lee, Hwaseong-si (KR); Jaywoo Kim, Yongin-si (KR); Chanmin Park, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 772 days.

(21) Appl. No.: 11/000,932

(22) Filed: Dec. 2, 2004

(65) Prior Publication Data

US 2005/0117783 A1    Jun. 2, 2005

(30) Foreign Application Priority Data

Dec. 2, 2003   (KR) .................. 10-2003-0086742

(51) Int. Cl.
*G06K 9/00* (2006.01)
(52) U.S. Cl. .................... 382/118; 382/190
(58) Field of Classification Search .......... 382/118, 382/190
See application file for complete search history.

(56) References Cited

U.S. PATENT DOCUMENTS

| | | | |
|---|---|---|---|
| 6,108,437 A * | 8/2000 | Lin | 382/118 |
| 6,751,354 B2 * | 6/2004 | Foote et al. | 382/224 |
| 2003/0103652 A1 * | 6/2003 | Lee et al. | 382/118 |
| 2003/0147556 A1 * | 8/2003 | Gargesha et al. | 382/190 |
| 2003/0215115 A1 * | 11/2003 | Kim et al. | 382/118 |

* cited by examiner

*Primary Examiner* — Stephen Koziol
(74) *Attorney, Agent, or Firm* — Staas & Halsey LLP

(57) ABSTRACT

A face recognition apparatus and method. The face recognition apparatus includes: a face database (face DB) which stores information of a plurality of registered persons and which stores a plurality of facial images of each registered person; a face retrieval unit which performs a face retrieval of an input facial image with reference to the face DB and outputs confidence values of the stored facial images; a candidate selection unit which determines candidates, which are selected among the facial images stored in the face DB on the basis of the confidence values; and a face verification unit which compares feature vectors of the input facial image and feature vectors of images corresponding to each candidate one by one and recognizes the input facial image.

24 Claims, 3 Drawing Sheets

LARGE VOLUME FACE RECOGNITION APPARATUS AND METHOD

CROSS-REFERENCE TO RELATED APPLICATION

This application claims the priority of Korean Patent Application No. 2003-86742, filed on Dec. 2, 2003, in the Korean Intellectual Property Office, the disclosure of which is incorporated herein by reference.

BACKGROUND OF THE INVENTION

1. Field of the Invention

The present invention relates to a large volume face recognition apparatus and a method of large volume facial recognition, and more particularly, to a face recognition apparatus and method, by which large volume face images are quickly recognized using face retrieval and face verification.

2. Description of Related Art

A face recognition system to identify people by using a camera and a computer is one of the most prominent biometrics systems with respect to user convenience. Unlike other biometrics systems, a face recognition system does not require a password or a personal identification number (PIN), or any kind of physical contact like in a fingerprint recognition system or an iris recognition system.

Accordingly, increasingly and in various countries, face recognition technology identifying people using face characteristics and not using PIN numbers or fingerprints has been commercialized in financial organizations such as banks. Also, the face recognition systems can be applied to various applications such as password control systems in airports and ports, security gate control systems of high security buildings, electronic transactions using a super highway network, and devices for authenticating sanctioners or users in e-commerce operations.

However, a conventional face recognition procedure is time consuming since a face is recognized by sequentially comparing a current facial image input from a camera and facial images stored in a large volume database.

BRIEF SUMMARY

An aspect of the present invention provides an apparatus and method for recognizing a face by selecting candidate images by performing a face retrieval with respect to an input facial image and comparing the input facial image and the selected candidate images.

According to an aspect of the present invention, there is provided a face recognition apparatus including: a face database (face DB) which stores information of a plurality of registered persons and which stores a plurality of facial images of each registered person; a face retrieval unit which performs a face retrieval of an input facial image with reference to the face DB and outputs confidence values of the stored facial images; a candidate selection unit which determines candidates, which are selected among the facial images stored in the face DB on the basis of the confidence values; and a face verification unit which compares feature vectors of the input facial image and feature vectors of images corresponding to each candidate one by one and recognizes the input facial image.

According to another aspect of the present invention, there is provided a face recognition method including: registering a plurality of persons and storing a plurality of facial images of each registered person; performing a face retrieval for an input facial image with reference to the stored facial images and calculating confidence values of the stored facial images; determining candidates corresponding to a predetermined number of facial images, which are selected among the stored facial images on the basis of the confidence values; and comparing feature vectors of the input facial image with feature vectors of each candidate one by one and recognizing the input facial image.

According to another aspect of the present invention, there is provided a method including: registering persons and storing facial images of the registered persons; calculating confidence values of facial images by comparing the facial images with an input image; determining candidate images using the confidence values; and verifying the input image by comparing the input image with the candidate images.

According to another aspect of the present invention, there is provided a method of increasing a speed of a facial recognition operation, including: selecting a predetermined number of facial images similar to an input image from a face database using a face retrieval operation; and verifying the input image one by one with registers corresponding to the selected facial images.

According to other aspects of the present invention, at least the aforementioned methods of the present invention may be implemented via computer-readable storage media encoded with processing instructions for causing a processor to execute the methods.

BRIEF DESCRIPTION OF THE DRAWINGS

These and/or other aspects and advantages of the present invention will become apparent and more readily appreciated from the following detailed description, taken in conjunction with the accompanying drawings of which.

Figure 1:
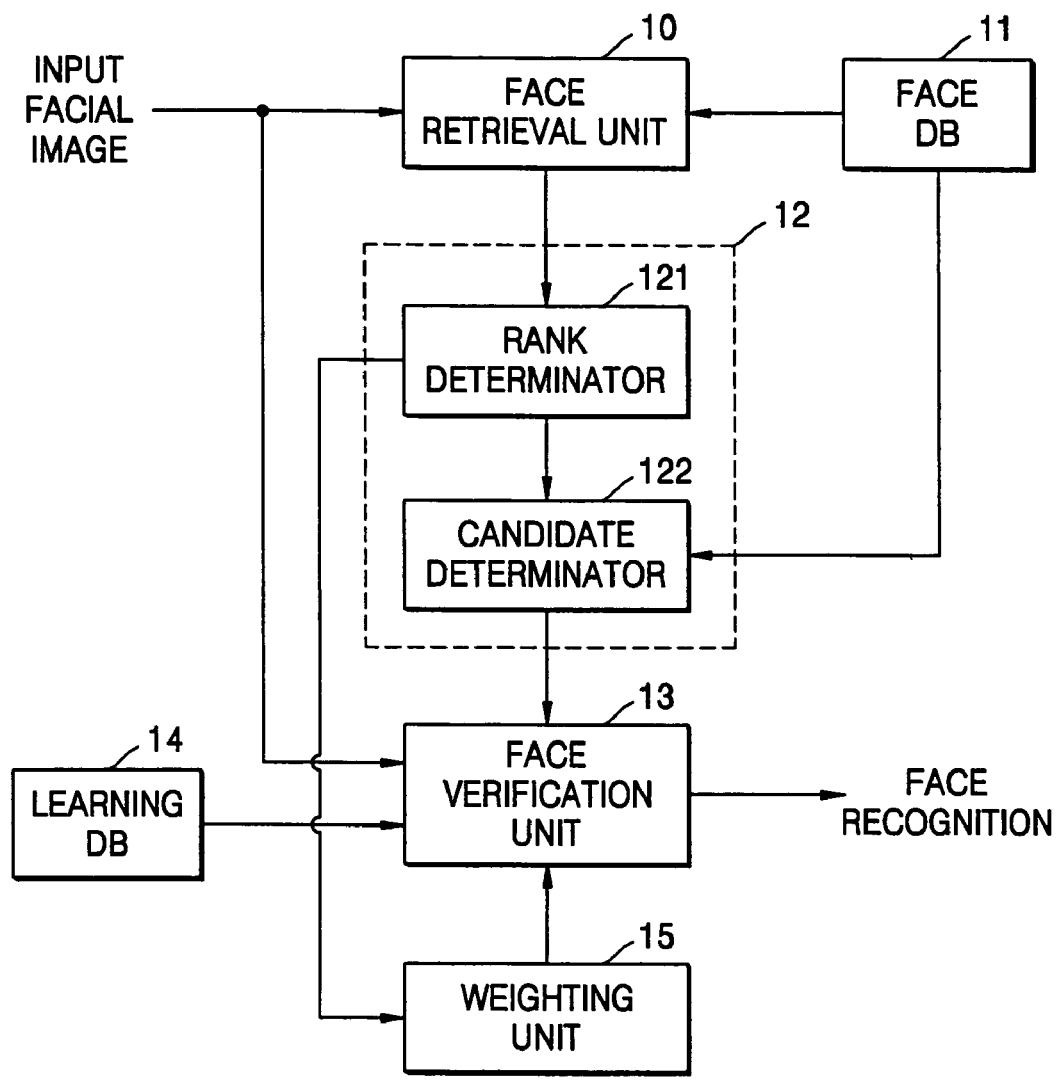
FIG. 1 is a block diagram of a face recognition apparatus according to an embodiment of the present invention.

Reference will now be made in detail to an embodiment of the present invention, examples of which are illustrated in the accompanying drawings, wherein like reference numerals refer to the like elements throughout. The embodiment is described below in order to explain the present invention by referring to the figures.

FIG. 1 is a block diagram of a face recognition apparatus according to an embodiment of the present invention. Referring to FIG. 1, a face recognition apparatus includes a face retrieval unit 10, a face database (DB) 11, a candidate selection unit 12, and a face verification unit 13.

The candidate image selection unit 12 includes a rank determinator 121 and a candidate determinator 122.

The face verification unit 13 further includes a learning DB 14 and a weighting unit 15.

Figure 2:
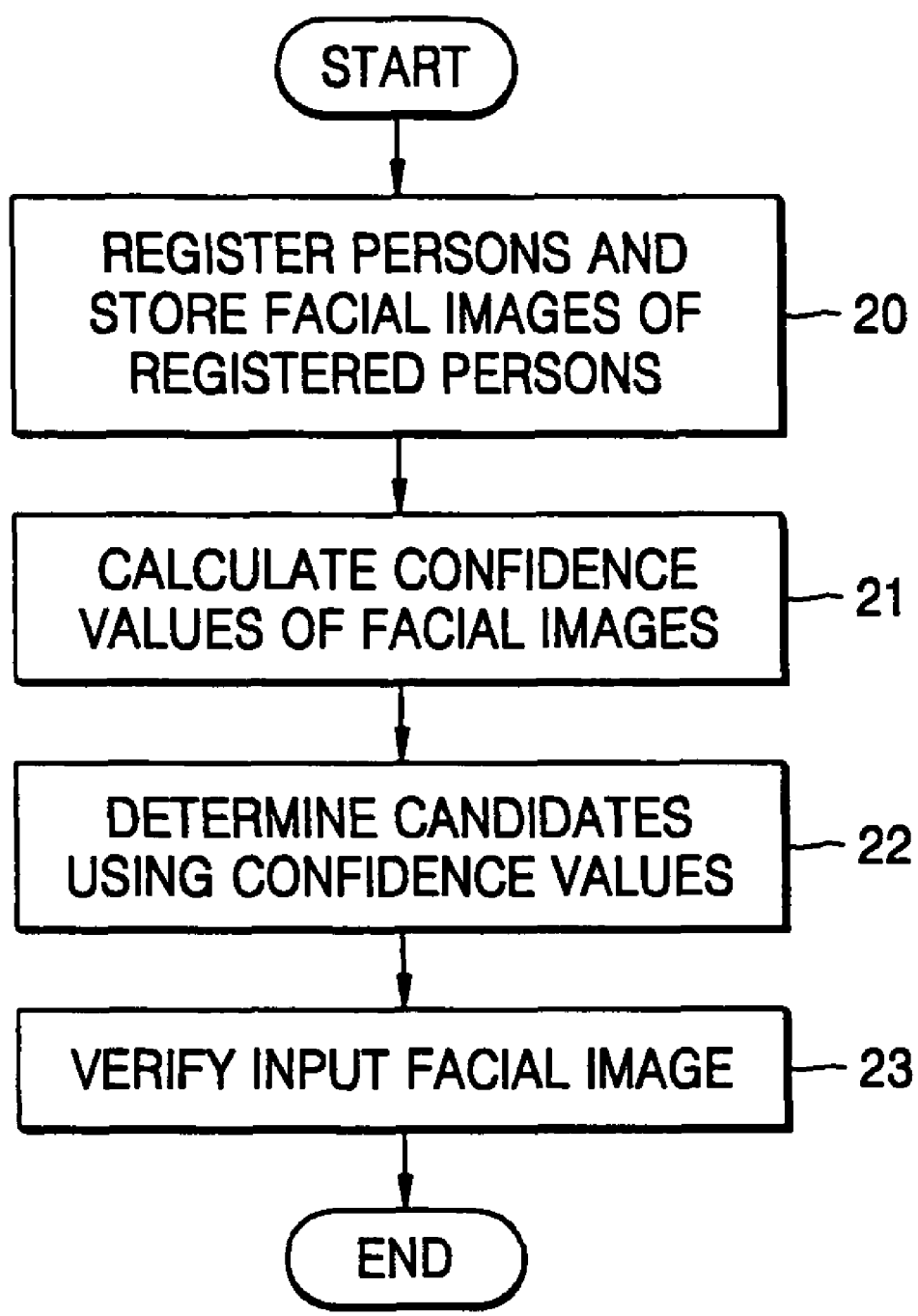
FIG. 2 is a flowchart of a face recognition method according to an embodiment of the present invention.

An operation of a face recognition apparatus according to the configuration of FIG. 1 will now be described with concurrent reference to FIG. 1 and the flowchart of FIG. 2.

The face DB 11 stores information of registered persons including an identification (ID) and a plurality of facial images, according to a face pose, face expression, or lighting conditions, of every registered person in operation 20.

The face retrieval unit 10 compares the facial images stored in the face DB 11 and an input facial image using a predetermined face retrieval algorithm and calculates confidence values of the stored facial images according to their similarity with the input facial image in operation 21. The face retrieval unit 10 may use, by way of a non-limiting example, a component-based linear discriminant analysis (LDA) algorithm. Such a component-based LDA algorithm classifies a facial image according to facial components such as a forehead, eyebrows, a nose, cheeks, and a mouth, and expresses each image as vectors for the classified components. That is, every kth component of N images, for example, a partial image of a right eye, is expressed as a vector, and then an LDA feature transformation matrix of each set of the component vectors is obtained. Finally, an LDA matrix corresponding to the kth component is calculated and LDA matrices for L components are stored.

The face retrieval unit 10 divides an input image into facial components, operates vectors representing the divided components with the LDA matrices corresponding to the divided components, and obtains LDA feature vectors. Confidence values indicating a similarity between the obtained LDA feature vectors and LDA feature vectors of each facial image stored in the face DB 11 are calculated.

The rank determinator 121 ranks of facial images of the face DB 11 with reference to the confidence values calculated by the face retrieval unit 10.

The candidate determinator 122 determines K images as candidate images in the determined rank order and obtains IDs corresponding to the K candidate images with reference to the information stored in the face DB 11 in operation 22. The value K, for example, may be limited to the number of images capable of being displayed on a screen or selected by a user.

Figure 3:
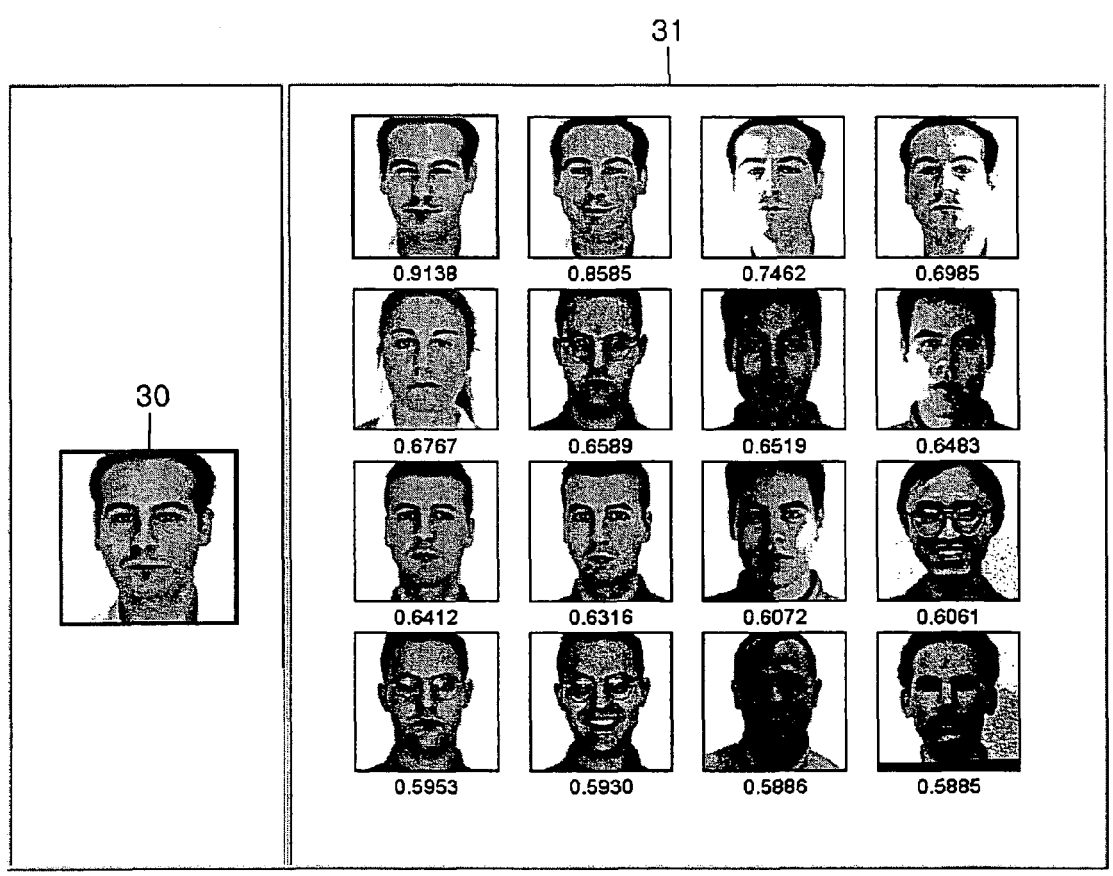
FIG. 3 shows an input facial image and facial images selected by a candidate image determinator of FIG. 1.

FIG. 3 shows an input facial image and facial images determined as candidate images by the candidate determinator 122 and displayed on a screen. When a facial image 30 is an input facial image to be identified, the face retrieval unit 10 calculates confidence values by retrieving facial images of the face DB 11 using a face retrieval algorithm. The rank determinator 121 determines ranks of the facial images based on the confidence values, and the candidate determinator 122 displays K images in rank order on the screen as shown by numeral 31. As FIG. 3 illustrates, facial images of a registered person resembling the input facial image are more likely to be included than the facial images of other persons in a high confidence value order.

The face verification unit 13 verifies the input image by comparing the input image with the K images using a predetermined algorithm, and recognizes an ID of a candidate image selected according to the verification result to be the ID of the input image in operation 23. The verification algorithm may be, by way of a non-limiting example, a support vector machine (SVM) algorithm.

An SVM algorithm, a classifier, obtains feature vectors of components of an input facial image and determines whether the obtained feature vectors belong to a subspace corresponding to each person in a face feature vector space made up of feature vectors of facial images stored in the face DB 11. The SVM algorithm refers to the learning DB 14 when classifying the input facial image. The learning DB 14 stores parameters composing a hyper plane in the feature vector space allowing each person registered in the face DB 11 to be discriminated from other registered persons by using feature vectors obtained by components of a plurality of facial images corresponding to each registered person. The number of SVM classifiers is the same as the number of registered persons in the face DB 11. Therefore, there is obtained a similarity determining whether feature vectors of the input image are in a subspace of each person whose ID is determined as a candidate by the candidate determinator 122 using an SVM classifier. The similarity indicates how similar the feature vectors of the input image and feature vectors of each registered image are, namely a degree of correlation between the feature vectors. The similarity can be obtained by applying an SVM classifier corresponding to each candidate ID to the feature vectors of the input image. The face verification unit 13 recognizes a candidate having the highest similarity among the selected candidate images as a person corresponding to the input image as a result of performing the SVM for the input images.

The face verification unit 13 may also include a weighting unit 15. The weighting unit 15 weighs a weight when calculating the similarity and allocates different weights to candidate images. For example, the different weights are respectively allocated to the candidate facial images determined by the candidate determinator 122 according to ranks of the confidence values determined by the face retrieval unit 10. That is, the greater the confidence value, the higher the weight. Alternatively, different weights can be weighed according to a number of facial images corresponding to the same ID in the candidate facial images determined by the candidate determinator 122. That is, a higher weight is allocated to a candidate having more facial images to be included in the candidate facial images. The face recognition is finally performed by adding the weight to the similarity obtained by the face verification unit 13.

Table 1 shows a result of performing face recognition of 300 registers using a conventional LDA, a conventional SVM, and a face recognition method according to the present embodiment, respectively.

TABLE 1

|  | FRR | FAR | Recognition Speed |
|---|---|---|---|
| LDA | 24% | 2% | 130 ms |
| SVM | 10% | 2% | 700 ms |
| Present Embodiment of the Present Invention | 4% | 2% | 330 ms |

Here, a false rejection ratio (FRR) is a ratio of occurrences of a decision that no match exists in spite of actual existing of the match, and a false acceptance ratio (FAR) is a ratio of occurrences of a decision that a match exists in spite of no existing of the match. Referring to Table 1, the FRR of the present embodiment is lower than the FRRs of conventional technologies, and the recognition speed of the present embodiment is faster the recognition speed of the conventional SVM method. The recognition speed of the present embodiment compared to that of the conventional LDA method is acceptable by the user and can be compensated for with the better recognition performance.

The large volume face recognition method according to the present embodiment can also be embodied as computer readable codes on computer readable recording media. Such computer readable recording media include any data storage device that can store data which can be thereafter read by a computer system. Examples of the computer readable recording media include read-only memory (ROM), random-access memory (RAM), CD-ROMs, magnetic tapes, floppy disks, optical data storage devices, and carrier waves (such as data transmission through the Internet). The computer readable recording media can also be distributed over network coupled computer systems so that the computer readable code is stored and executed in a distributed fashion.

As described above, according to the disclosed embodiment of the present invention, high recognition accuracy and an improved recognition speed are achieved by selecting a predetermined number of facial images similar to an input image from a face database using a face retrieval operation and verifying the input image one by one with registers corresponding to the selected facial images.

Although an embodiment of the present invention has been shown and described, the present invention is not limited to the described embodiment. Instead, it would be appreciated by those skilled in the art that changes may be made to the embodiment without departing from the principles and spirit of the invention, the scope of which is defined by the claims and their equivalents.

What is claimed is:

1. A face recognition apparatus comprising:
    a face database (face DB) which stores information of a plurality of registered persons and which stores a plurality of facial images of each registered person;
    a face retrieval unit which performs a face retrieval of an input facial image with reference to the face DB and outputs confidence values of the stored facial images;
    a candidate selection unit which determines candidates by selecting a predetermined number of images from among the facial images stored in the face DB on the basis of the confidence values; and
    a face verification unit which compares feature vectors of the input facial image and feature vectors of images corresponding to each candidate one by one and recognizes the input facial image.

2. The apparatus of claim 1, wherein the candidate selection unit includes:
    a rank determinator which determines ranks of the stored facial images on the basis of the confidence values; and
    a candidate determinator which selects a predetermined number of images according to the determined ranks and determining candidates corresponding to the selected images.

3. The apparatus of claim 1, wherein the face verification unit includes:
    a learning database (learning DB) which stores parameters of hyper planes allowing each person registered in the face DB to be discriminated from other registered persons by using feature vectors of facial images corresponding to each registered person in a face feature vector space made by feature vectors extracted from the facial images stored in the face DB.

4. The apparatus of claim 3, wherein the face verification unit reads parameters corresponding to each candidate from the learning DB, calculates a similarity between the read parameters and parameters extracted from the input facial image for each candidate, and recognizes a candidate having the highest similarity as a registered person corresponding to the input facial image.

5. The apparatus of claim 4, wherein the face verification unit includes:
    a weighting unit which allocates different weights to facial images corresponding to each candidate according to the ranks of the facial images, when calculating the similarity.

6. The apparatus of claim 4, wherein the face verification unit includes:
    a weighting unit which allocates different weights to the facial images selected by the candidate determinator according to a number of facial images corresponding to each candidate, when calculating the similarity.

7. The apparatus of claim 1, wherein the face verification unit uses a support vector machine (SVM) algorithm which obtains feature vectors of components of the input facial image and determines whether the obtained feature vectors belong to a subspace corresponding to each person in a face feature vector space made up of feature vectors of facial images stored in the face DB.

8. The apparatus of claim 1, wherein the face retrieval unit uses a component-based linear discriminant analysis (LDA) algorithm which classifies a facial image according to facial components and expresses each image as vectors for the classified components.

9. The apparatus of claim 8, wherein the facial components include a forehead, eyebrows, a nose, cheeks, and a mouth.

10. The apparatus of claim 8, wherein, in the LDA, for every kth component of N images, at least a partial image of a facial component is expressed as a vector, and
    wherein the facial retrieval unit computes an LDA feature transformation matrix of each set of the component vectors, calculates an LDA matrix corresponding to the kth component, and stores LDA matrices for L components.

11. The apparatus of claim 10, wherein the face retrieval unit divides the input image into facial components, operates vectors representing the divided components with the LDA matrices corresponding to the divided components, and obtains LDA feature vectors.

12. A face recognition method comprising:
    registering a plurality of persons and storing a plurality of facial images of each registered person;
    performing a face retrieval for an input facial image with reference to the stored facial images and calculating confidence values of the stored facial images;
    determining candidates corresponding to a predetermined number of facial images, which are selected among the stored facial images on the basis of the confidence values; and
    comparing feature vectors of the input facial image with feature vectors of each candidate one by one and recognizing the input facial image.

13. The method of claim 12, wherein the determining includes:
    determining ranks of the stored facial images on the basis of the confidence values; and
    selecting the predetermined number of facial images according to the determined ranks and determining candidates corresponding to the selected facial images.

14. The method of claim 12, wherein the comparing includes:
    storing parameters of hyper planes allowing each registered person to be discriminated from other registered persons by using feature vectors of facial images corresponding to each registered person in a face feature vector space made by feature vectors extracted from the facial images stored in the registering.

15. The method of claim 14, wherein the comparing includes:
    calculating a similarity between feature vectors of the facial images corresponding to each candidate and feature vectors extracted from the input facial image for each candidate and recognizing a candidate having the highest similarity as a registered person corresponding to the input facial image.

16. The method of claim 15, wherein the comparing includes:
    allocating different weights to facial images corresponding to each candidate according to ranks of the facial images, when calculating the similarity.

17. The method of claim 15, wherein the comparing includes:

allocating different weights to the facial images selected in the determining according to a number of facial images corresponding to each candidate, when calculating the similarity.

18. A non-transitory computer readable storage medium encoded with processing instructions for causing a processor to execute a face recognition method, the method comprising:
registering a plurality of persons and storing a plurality of facial images of each registered person;
performing a face retrieval for an input facial image with reference to the stored facial images and calculating confidence values of the stored facial images;
determining candidates corresponding to a predetermined number of facial images, which are selected among the stored facial images on the basis of the confidence values; and
comparing feature vectors of the input facial image with feature vectors of each candidate one by one and recognizing the input facial image.

19. A method comprising:
registering persons and storing facial images of the registered persons;
calculating confidence values of facial images by comparing the facial images with an input image;
determining candidate images using the confidence values; and
verifying the input image by comparing the input image with the candidate images,
wherein the comparing includes calculating respective similarities between aspects of the input image and corresponding aspects of the candidate images, allocating respective weights to each candidate, and identifying a candidate corresponding to the input image based upon a comparison of respective combinations of allocated weights and calculated similarities.

20. A non-transitory computer readable storage medium encoded with processing instructions for causing a processor to execute a method, the method comprising:
registering persons and storing facial images of the registered persons;
calculating confidence values of facial images by comparing the facial images with an input image;
determining candidate images using the confidence values; and
verifying the input image by comparing the input image with the candidate images,
wherein the comparing includes calculating respective similarities between aspects of the input image and corresponding aspects of the candidate images, allocating respective weights to each candidate, and identifying a candidate corresponding to the input image based upon a comparison of respective combinations of allocated weights and calculated similarities.

21. A facial recognition method, comprising:
selecting a predetermined number of facial images, similar to an input image, from a face database using a face retrieval operation based on plural computed similarities for the input image and each facial image in the face database;
comparing calculated feature vectors for the input image one by one with respective plural feature vectors of each facial image from the selected facial images to identify similarities between the input image and each facial image of the selected facial images; and
verifying a facial image of the selected facial images as corresponding to the input image based on a result of the comparing.

22. A non-transitory computer readable storage medium encoded with processing instructions for causing a processor to execute a facial recognition method, the method comprising:
selecting a predetermined number of facial images, similar to an input image, from a face database using a face retrieval operation based on plural computed similarities for the input image and each facial image in the face database;
comparing calculated feature vectors for the input image one by one with respective plural feature vectors of each facial image from the selected facial images to identify similarities between the input image and each facial image of the selected facial images; and
verifying a facial image of the selected facial images as corresponding to the input image based on a result of the comparing.

23. The method of claim 19, wherein the comparing further comprises allocating the weights to each of the candidate images according to a number of corresponding candidate images within the candidate images that correspond to a same candidate.

24. The non-transitory computer readable storage medium of claim 20, wherein the comparing further comprises allocating the weights to each of the candidate images according to a number of corresponding candidate images within the candidate images that correspond to a same candidate.

* * * * *